US012711377B2

(12) United States Patent
Han et al.

(10) Patent No.: US 12,711,377 B2
(45) Date of Patent: Aug. 18, 2026

(54) AUTOMATED GENERATION OF TRAINING DATA FOR AN ARTIFICIAL-INTELLIGENCE BASED INCIDENT RESOLUTION SYSTEM

(71) Applicant: International Business Machines Corporation, Armonk, NY (US)

(72) Inventors: Shirley M. Han, New York, NY (US); Rama Kalyani T. Akkiraju, Cupertino, CA (US); Xiaotong Liu, San Jose, CA (US); Salil Ahuja, Washington, DC (US); Isabell Sippli, Metzingen (DE)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 18/133,607

(22) Filed: Apr. 12, 2023

(65) Prior Publication Data

US 2024/0346306 A1 Oct. 17, 2024

(51) Int. Cl.
*G06N 3/08* (2023.01)
*G06Q 30/04* (2012.01)

(52) U.S. Cl.
CPC ............... *G06N 3/08* (2013.01); *G06Q 30/04* (2013.01)

(58) Field of Classification Search
CPC ................................ G06N 3/08; G06Q 30/04
See application file for complete search history.

(56) References Cited

U.S. PATENT DOCUMENTS

| | | | | |
|---|---|---|---|---|
| 10,554,687 | B1 | 2/2020 | Satish et al. | |
| 10,956,255 | B1 * | 3/2021 | Al-Bahar | G06F 40/35 |
| 11,503,061 | B1 | 11/2022 | Lin et al. | |
| 2015/0178637 | A1 * | 6/2015 | Bogojeska | G06N 5/04 706/12 |
| 2016/0150047 | A1 * | 5/2016 | O'Hare | G06F 3/0619 713/168 |
| 2018/0253736 | A1 * | 9/2018 | Rajaram | G06Q 30/016 |
| 2019/0378073 | A1 * | 12/2019 | Lopez | G06Q 10/0635 |
| 2020/0202268 | A1 | 6/2020 | Retna et al. | |
| 2020/0264947 | A1 | 8/2020 | Gokhale et al. | |
| 2022/0171641 | A1 * | 6/2022 | Pichiliani | H04L 51/56 |

FOREIGN PATENT DOCUMENTS

WO 2022093239 A1 5/2022

* cited by examiner

*Primary Examiner* — Kevin W Figueroa
(74) *Attorney, Agent, or Firm* — Anthony Curro

(57) ABSTRACT

An embodiment includes detecting incident data and resolution data in monitored data collected while monitoring an information technology (IT) environment. The embodiment correlates the incident data with the resolution data according to a detected change in health metrics data from the monitored data. The embodiment stores the correlated incident data and resolution data as a training dataset stored in a database and then trains a machine learning model using the training dataset. The embodiment deploys the trained machine learning model such that the trained machine learning model provides resolution recommendation in response to receiving new incident data.

17 Claims, 7 Drawing Sheets

*Fig. 2*

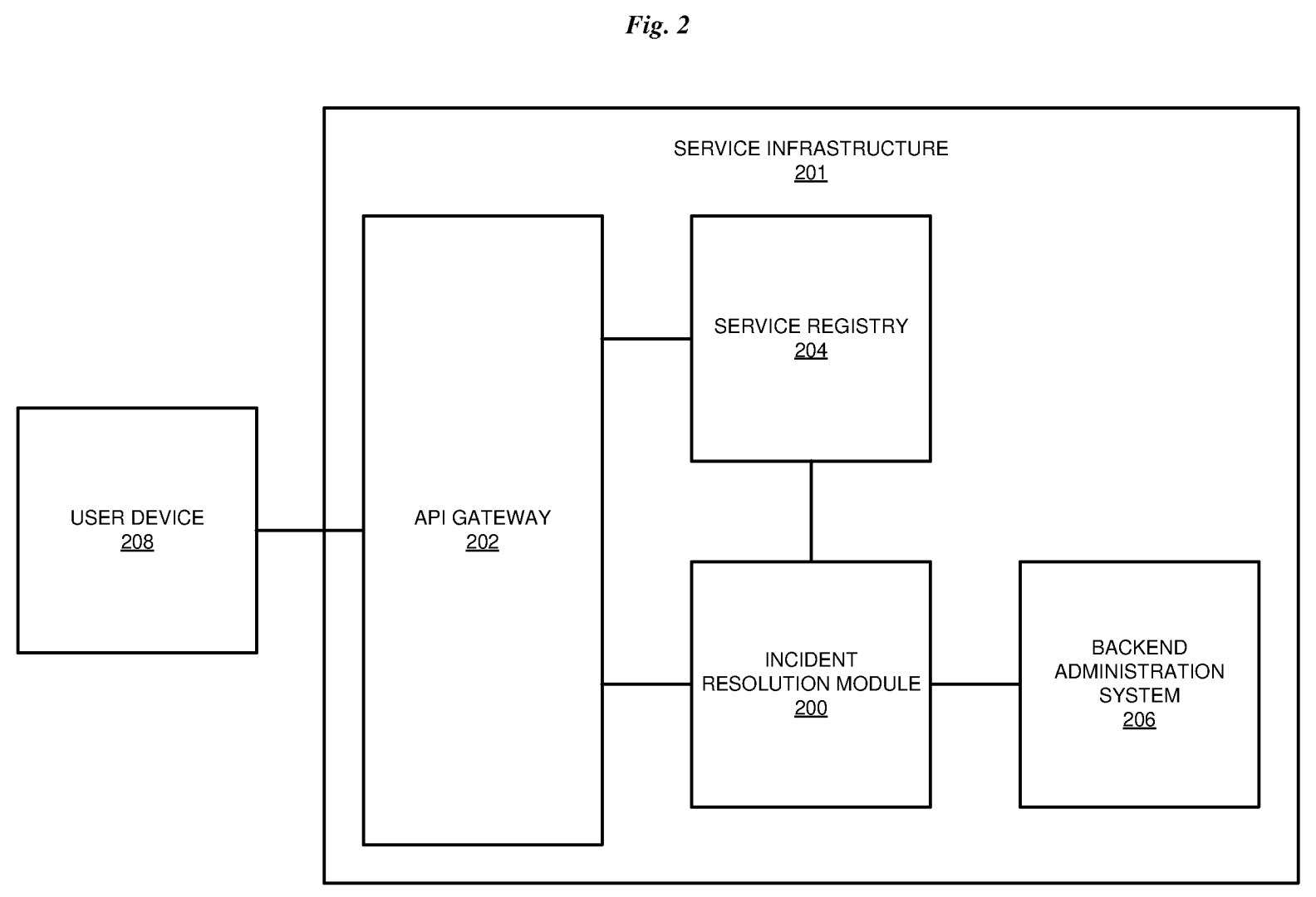

SERVICE INFRASTRUCTURE
201

SERVICE REGISTRY
204

INCIDENT
RESOLUTION MODULE
200

BACKEND
ADMINISTRATION
SYSTEM
206

API GATEWAY
202

USER DEVICE
208

*Fig. 3*

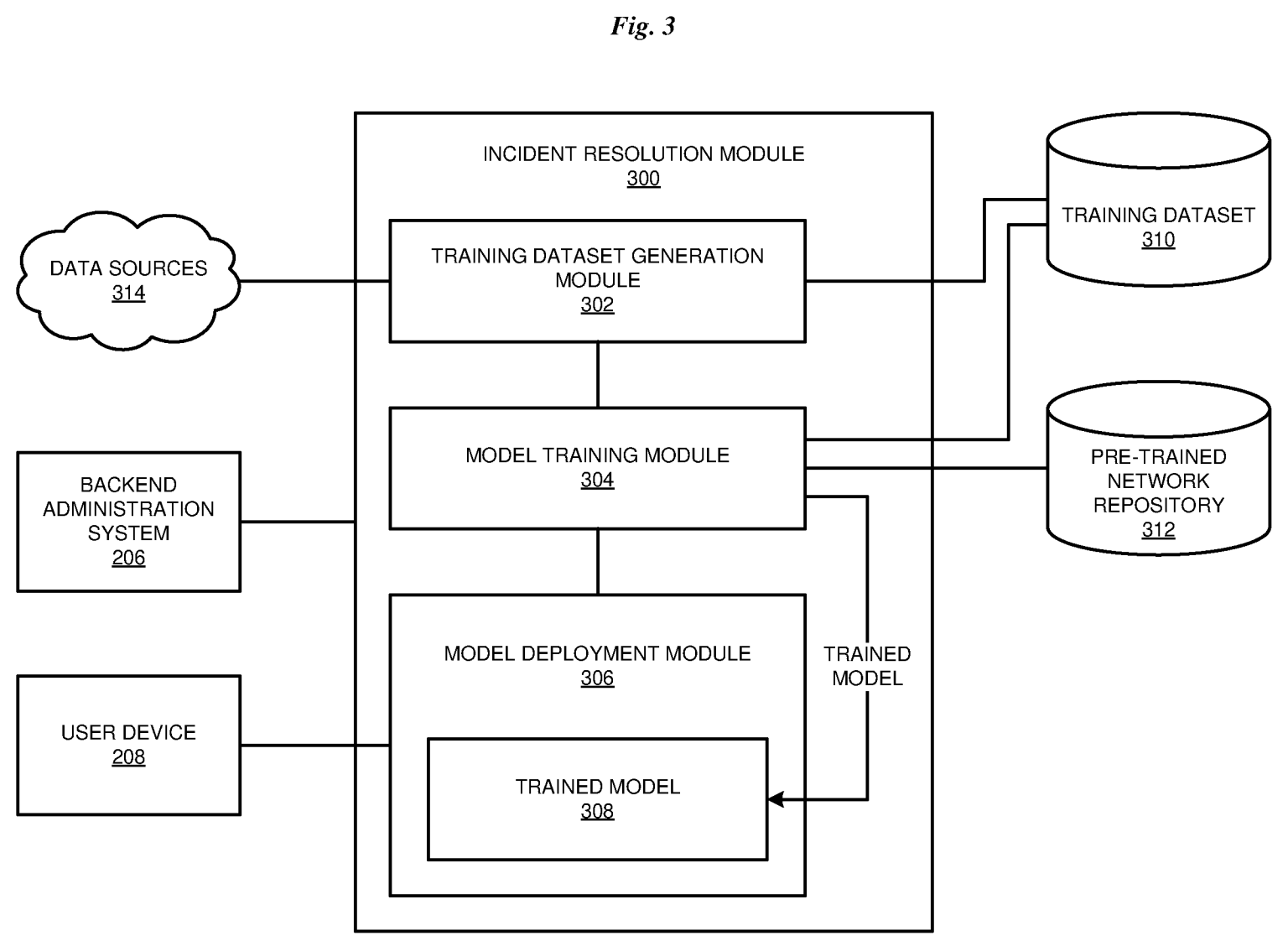

TRAINING DATASET 310

PRE-TRAINED NETWORK REPOSITORY 312

INCIDENT RESOLUTION MODULE 300

TRAINING DATASET GENERATION MODULE 302

MODEL TRAINING MODULE 304

TRAINED MODEL

MODEL DEPLOYMENT MODULE 306

TRAINED MODEL 308

DATA SOURCES 314

BACKEND ADMINISTRATION SYSTEM 206

USER DEVICE 208

Figure 4:
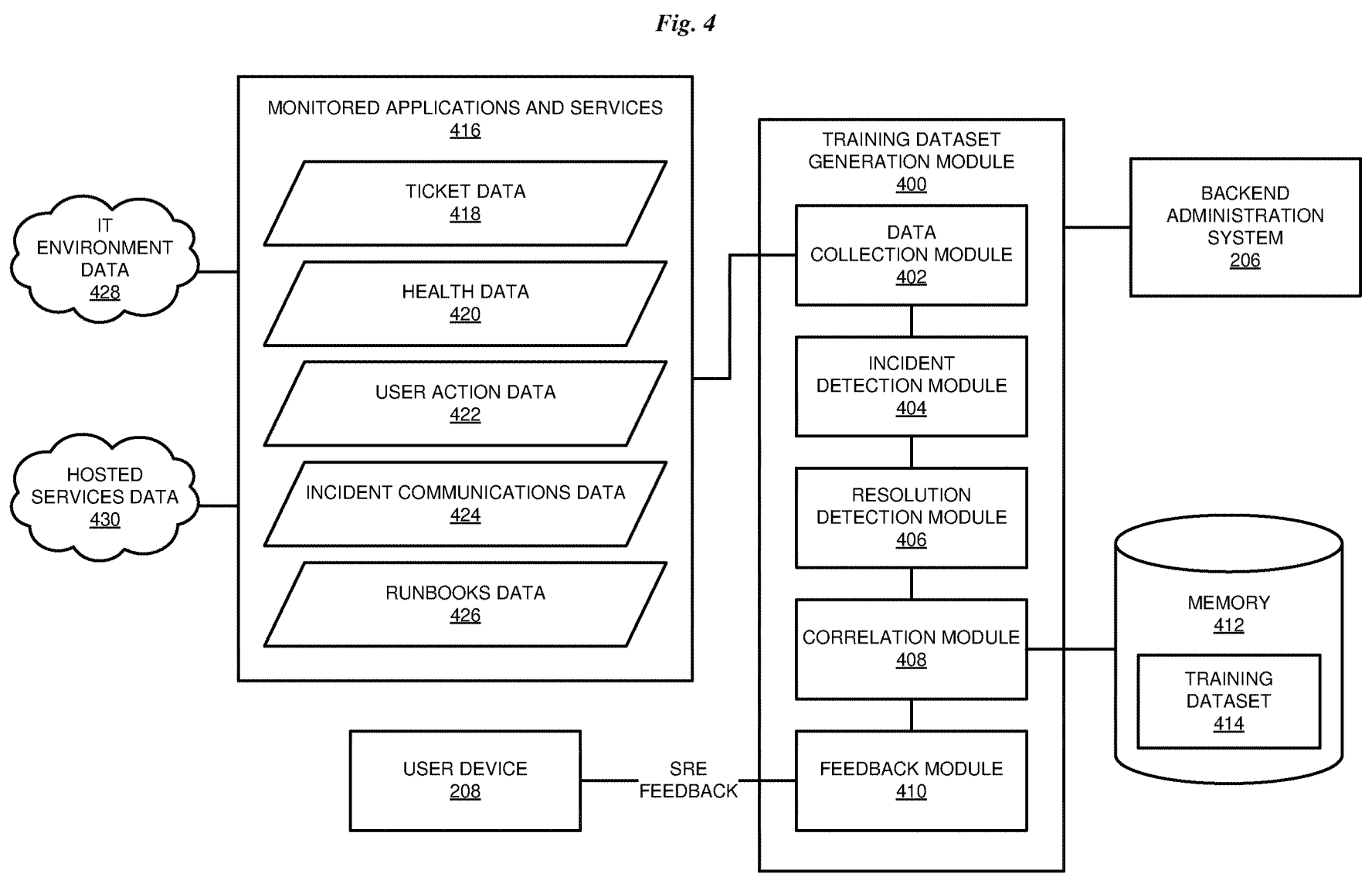

BACKEND ADMINISTRATION SYSTEM 206

MEMORY 412

TRAINING DATASET 414

TRAINING DATASET GENERATION MODULE 400

DATA COLLECTION MODULE 402

INCIDENT DETECTION MODULE 404

RESOLUTION DETECTION MODULE 406

CORRELATION MODULE 408

FEEDBACK MODULE 410

SRE FEEDBACK

USER DEVICE 208

MONITORED APPLICATIONS AND SERVICES 416

TICKET DATA 418

HEALTH DATA 420

USER ACTION DATA 422

INCIDENT COMMUNICATIONS DATA 424

RUNBOOKS DATA 426

IT ENVIRONMENT DATA 428

HOSTED SERVICES DATA 430

Figure 5:
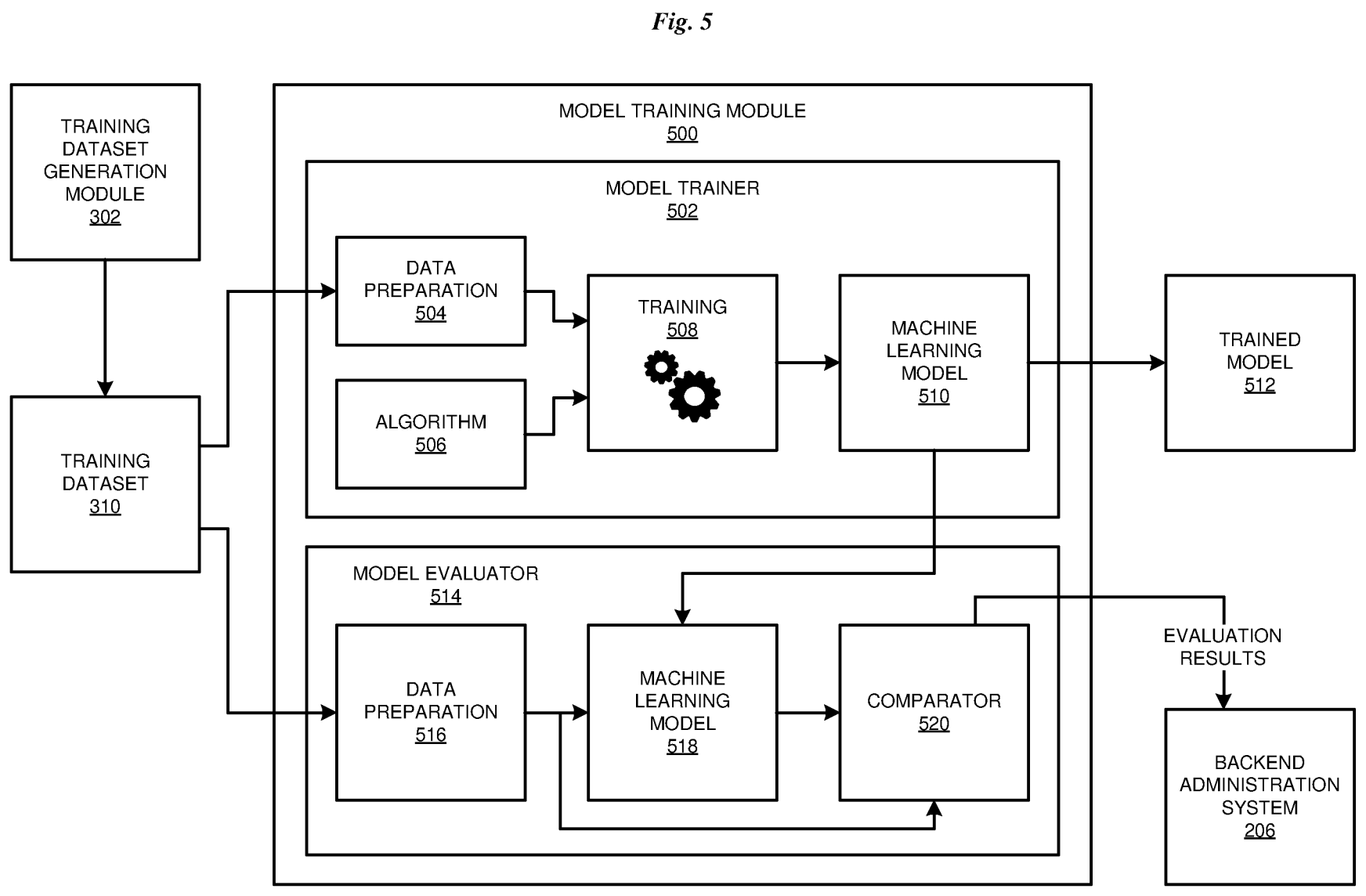

TRAINING DATASET GENERATION MODULE 302

TRAINING DATASET 310

MODEL TRAINING MODULE 500

MODEL TRAINER 502

DATA PREPARATION 504

ALGORITHM 506

TRAINING 508

MACHINE LEARNING MODEL 510

TRAINED MODEL 512

MODEL EVALUATOR 514

DATA PREPARATION 516

MACHINE LEARNING MODEL 518

COMPARATOR 520

EVALUATION RESULTS

BACKEND ADMINISTRATION SYSTEM 206

AUTOMATED GENERATION OF TRAINING DATA FOR AN ARTIFICIAL-INTELLIGENCE BASED INCIDENT RESOLUTION SYSTEM

BACKGROUND

The present invention relates generally to data processing using machine learning models. More particularly, the present invention relates to a method, system, and computer program for automated generation of training data for an artificial intelligence based incident resolution system.

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

Natural language processing (NLP) is one class of problems to which neural networks are applied. NLP refers to an area of computer science and Artificial Intelligence (AI) as well as linguistics that involves some form of processing of a natural language input. Natural language input is typically in the form of unstructured data. Unstructured data refers to information that either does not have a pre-defined data model or is not organized in a pre-defined manner. Unstructured data is often mostly composed of some form of text, for example in written or audio form. At a high level, NLP typically involves converting unstructured data into structured data.

SUMMARY

The illustrative embodiments provide for automated generation of training data for an artificial intelligence based incident resolution system. An embodiment includes detecting incident data and resolution data in monitored data collected while monitoring an information technology (IT) environment. The embodiment also includes correlating the incident data with the resolution data according to a detected change in health metrics data from the monitored data. The embodiment also includes storing the correlated incident data and resolution data as a training dataset stored in a database. The embodiment also includes training a machine learning model using the training dataset resulting in a trained machine learning model. The embodiment also includes deploying the trained machine learning model such that the trained machine learning model provides resolution recommendation in response to receiving new incident data. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 2 depicts a block diagram of an example service infrastructure in accordance with an illustrative embodiment;

FIG. 3 depicts a block diagram of an exemplary incident resolution module in accordance with an illustrative embodiment;

FIG. 4 depicts a block diagram of an exemplary training dataset generation module in accordance with an illustrative embodiment;

FIG. 5 depicts a block diagram of an exemplary model training module in accordance with an illustrative embodiment;

DETAILED DESCRIPTION

Figure 1:
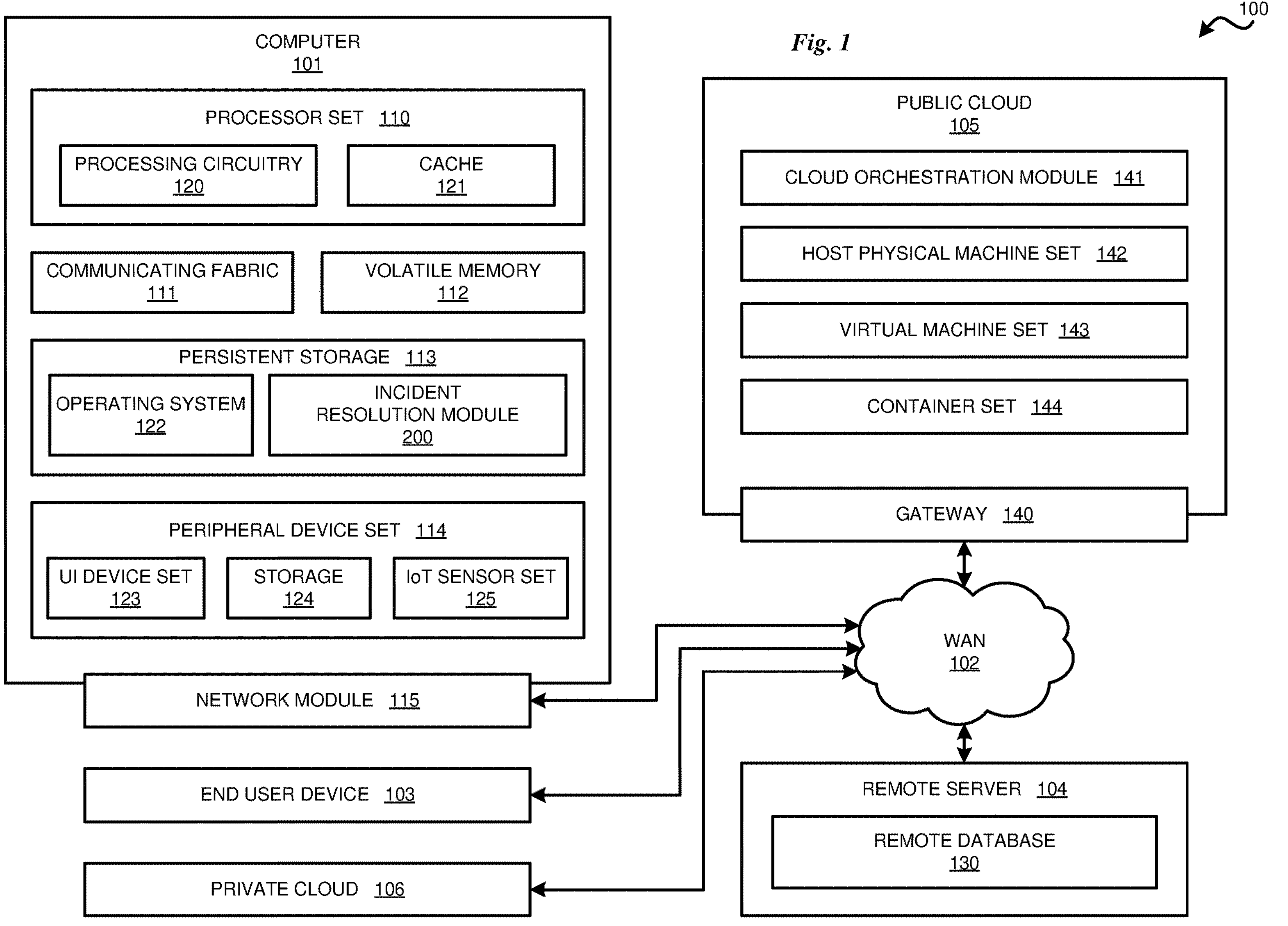
FIG. 1 depicts a block diagram of a computing environment in accordance with an illustrative embodiment.

Artificial intelligence, implemented with neural networks and deep learning models, has demonstrated great promise as a technique for automatically analyzing real-world information with human-like accuracy. In general, such neural network and deep learning models receive input information and make predictions based on the same. Whereas other approaches to analyzing real-world information may involve hard-coded processes, statistical analysis, and/or the like, neural networks learn to make predictions gradually, by a process of trial and error, using a machine learning process.

Natural Language Understanding (NLU) is an area of NLP that uses neural network and deep learning models to analyze and extract information from unstructured text. NLU primarily involves analyzing text and extracting metadata from unstructured content such as concepts, entities, keywords, categories, sentiment, emotion, relations, and semantic roles. A given neural network model may be trained to perform NLU tasks using a training dataset.

The goal of training a neural network is optimization of the model weight parameters. A typical training process involves performing several iterations (also referred to as epochs) of a batch process that involves processing each of the training instances in the training dataset, determining a loss value indicative of an overall difference between the expected outputs and actual outputs of the neural network, and adjusting the weight parameters to reduce the loss value.

Ideally, the weight parameter values are gradually adjusted over the course of several iterations such that the neural network achieves a high degree of accuracy.

Another core element in the training of a neural network is regularization, which refers to strategies intended to avoid overfitting. Overfitting refers to a situation in which a neural network gives accurate results for training data but is unable to generalize and maintain that accuracy for new data. Overfitting commonly occurs when a training dataset is too small. When a training dataset is too small, the neural network has fewer examples to learn from, increasing the risk of overfitting.

Thus, effective training of a neural network for NLP applications requires a large number of training examples. In some cases, a pre-trained neural network may be obtained that is able to accurately detect a basic set of language features. However, in many situations, the pre-trained neural network still requires further training to be useful for specific applications. For example, additional training is needed to train a pre-trained neural network to understand specialized terminology, such as terms specific to technical or medical field applications. In these situations, a large training dataset is still necessary to effectively train a neural network.

Thus, the training process is heavily dependent on the size and contents of the training dataset. There are many things that can go wrong with the training process if the training dataset is not carefully chosen or assembled. For this reason, the training process is a time-intensive and complex task. This is true for the initial training of a neural network as well as for retraining a pre-trained neural network.

An effective training dataset will include a vast number of training instances. In order to achieve an acceptable level of accuracy, a neural network may be trained on millions, or billions, of annotated training instances. Such training datasets are so large that it would be impractical or impossible for a human to assemble and thoroughly review the dataset in detail.

Since manually assembling such a large dataset would be a monumental task that is well beyond what is practical for a human, there are many specialized applications for which neural networks could be effective but nevertheless go unused. For example, an organization considering the use of neural network technology may decline to do so due to the overwhelming task of trying to assemble proper training data for their specific use case.

For example, the present disclosure recognizes that artificial intelligence (AI) technologies such as neural networks may be leveraged for improving efficiency and reducing downtime of information technology (IT) systems. IT services typically implement some form of IT service management (ITSM) aimed at maintaining and improving IT services. ITSM typically includes incident management among several other practice areas. Incident management refers to a process of responding to an incident with the goal of restoring the service with minimal impact on users and business. In the field of incident management, an "incident" refers to an unplanned interruption or reduction in quality of an IT service, which may involve any type of IT operational incident including those involving hardware and/or software components.

An incident management tool is one supported by an incident ticket system (ITS), which is a software system that runs in an organization and keeps records referred to as "tickets" of malfunctions and/or affected services. A ticket is a record that contains information about a failure or malfunction, as well as information concerning support interventions made by technical support or third parties on behalf of a user who has reported an incident.

The present disclosure recognizes that the information collected in such tickets includes information relating incidents and resolutions and may therefore be extracted for use as a training dataset. However, the present disclosure also recognizes that, while the information in such tickets is supposed to include root cause information and actions that were used to address the root cause, in practice this data is oftentimes entered manually by end users, and the quality depends on the due diligence performed by humans when entering the data. Hence, the information in tickets regarding root cause and actions taken varies highly in quality and completeness. It is therefore difficult to rely on such ticket data to provide the information necessary for training a neural network.

Aspects of the present disclosure address the deficiencies described above by providing a process (as well as a system, method, machine-readable medium, etc.) that collects data from multiple sources and analyzes the collected data to identify data related to incidents or incident resolutions. Exemplary embodiments correlate data related to incidents with data related to corresponding resolutions and create a knowledge database from the correlated data. Exemplary embodiments use the correlated data in the knowledge database as training data to train a machine learning model recommend a resolution for inputted incident data.

In exemplary embodiments, the process autonomously and automatically collects information from multiple sources. For example, in some embodiments, the process collects data generated in an information technology (IT) environment, such as system metrics and data generated by micro-services.

In exemplary embodiments, the process correlates incidents with runbooks. A runbook is a controlled set of automated and manual steps that support system and network operational processes. A runbook orchestrates all types of infrastructure elements, like applications, network components, or servers. A runbook can comprise a set of runbook actions (e.g., list of operations, procedures, steps, and the like) to be performed by operations, e.g., Site Reliability Engineers (SREs), with respect to a system or service in connection with an operational event, such as a system/service incident, scheduled maintenance, or a support operation. The set of runbook actions can be user invoked (e.g., performed or executed based on a user selection) through an interactive electronic document or automatically invoked (e.g., automatically performed or executed based on a condition of the runbook or the interactive electronic document). A non-limiting example of a runbook provides guidance on how to clean up a volume if there is an alert indicating that a system memory is running out of space. Runbooks can be either manual, i.e., step-by-step descriptions, or automated/semi-automated, such that the resolution involves running an application, a shell script, or an Ansible® playbook (Ansible is a registered trademark of Red Hat, Inc.).

In exemplary embodiments, the process deploys the trained model, for example, as an incident resolution system that receives incident data and responds with a resolution recommendation. In some such embodiments, the process solicits feedback regarding the resolution recommendation. The solicited feedback includes an indication of the accuracy or effectiveness of the recommended resolution. The solicited feedback may also include an indication of a more effective alternative resolution. In some such embodiments, the process uses the feedback to update the knowledge database and retrain the machine learning model.

In exemplary embodiments, the process continuously monitors micro services, metrics, and issues in an IT environment to observe any incidents. When an incident is identified, the process monitors data related to actions taken to resolve the identified incident. For example, in some embodiments, the process recognizes an incident and identifies one or more runbooks run by SREs to resolve the incident. The process then correlates the resolution with the incident in the knowledge database, data indicative of end user actions tracked on user interfaces, data indicative of temporal and keyword based analysis of incidents and runbooks, and data resulting from data mining and analysis of communications, such as instant messaging or chat data.

In some embodiments, the process correlates resolution actions with incidents using health metric changes. For example, when services and APIs have been run on a given system, the process identifies that system health metrics have changed, for example using an application performance monitoring tool that constantly monitors services in a system. In such embodiments, the process identifies a resolution when a health metric improves as a result of a script or application being run on the system.

In some embodiments, the process correlates resolution actions with incidents using data indicative of end user actions tracked on user interfaces. In some such embodiments, end user actions are tracked, for example by tracking using a session cookie, as the user navigates a computerized library of previously created runbooks and automations via a user interface. For example, in some such embodiments, the process tracks which incident an SRE views, and then tracks the SRE's navigation to a list of available runbooks or automations, and tracks which runbooks the SRE observes, what keywords the SRE uses to search for a resolution, and which keywords are also included in the incident description. The tracking information is then used to link an incident with a resolution.

In some embodiments, the process correlates resolution actions with incidents using data indicative of temporal and keyword based analysis of incidents and runbooks. For example, in some embodiments, when an incident is created, within a defined time window, the process searches for matches between the incident and available runbooks by searching for runbooks having the same or similar keywords and entities, such as microservices and hosts (via IP addresses), or other identifiers.

In some embodiments, the process correlates resolution actions with incidents using data resulting from data mining and analysis of communications, such as instant messaging or chat data. For example, in some embodiments, the process analyses a chat sequence for an identifier of an incident ticket. If an incident is detected, the process analyzes subsequent portions of the chat sequence for relevant text that identifies resolution actions.

After correlating incidents and resolutions, the correlated incidents and resolutions are stored in a knowledge database. The process then uses the knowledge database as input data to train a machine learning model that will be used to understand relationships between incidents and resolution actions. The trained machine learning model is then deployed to recommend the resolution actions for users in response to inputted incident data. In some embodiments, the process allows the user to then provide feedback regarding the recommended resolution, and updates the knowledge database and retrains the machine learning model as needed in response to the user feedback.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved incident resolution module 200 that collects and correlates incident and resolution data to build a knowledge base that is then used to train a machine learning model. In addition to incident resolution module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and incident resolution module 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in incident resolution module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in incident resolution module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

With reference to FIG. 2, this figure depicts a block diagram of an example service infrastructure 201 in accordance with an illustrative embodiment. In the illustrated embodiment, the service infrastructure 201 includes the incident resolution module 200 of FIG. 1.

In the illustrated embodiment, the service infrastructure 201 provides services and service instances to a user device 208. User device 208 communicates with service infrastructure 201 via an API gateway 202. In various embodiments, service infrastructure 201 and its associated incident resolution module 200 serve multiple users and multiple tenants. A tenant is a group of users (e.g., a company) who share a common access with specific privileges to the software instance. Service infrastructure 201 ensures that tenant specific data is isolated from other tenants.

In the illustrated embodiment, service infrastructure 201 includes a service registry 204. In some embodiments, the incident resolution module 200 is hosted on a virtual machine and the service registry 204 looks up service instances for incident resolution module 200 in response to a service lookup request such as one from API gateway 202 in response to a service request from user device 208. For example, in some embodiments, the service registry 204 looks up service instances of incident resolution module 200 in response to requests related to incident resolution from the user device 208.

As described herein, the incident resolution module 200 may provide an intelligent incident resolution recommendation system that manifests in the form of an Internet website or a mobile application that is accessible by user device 208. A backend administration system 206 allows users with administrative privileges to perform various administrative tasks associated with the incident resolution module 200 as described herein, such as initiating a data collection and/or correlation process or a neural network training process.

In some embodiments, service registry 204 maintains information about the status or health of each service instance including performance information associated each of the service instances. In some such embodiments, such information may include various types of performance characteristics of a given service instance (e.g., cache metrics, etc.) and records of updates.

In some embodiments, user device 208 connects with API gateway 202 via any suitable network or combination of networks such as the Internet, etc. and uses any suitable communication protocols such as Wi-Fi, Bluetooth, etc. Service infrastructure 201 may be built on the basis of cloud computing. API gateway 202 provides access to client applications like the incident resolution module 200. API gateway 202 receives service requests issued by client applications and creates service lookup requests based on service requests. As a non-limiting example, in an embodiment, the user device 208 executes a routine to initiate interaction with the incident resolution module 200. For instance, in some embodiments, the user device 208 executes a routine to provide feedback used for revision of a knowledge database or a neural network such as described in connection with the embodiments disclosed herein.

With reference to FIG. 3, this figure depicts a block diagram of an exemplary incident resolution module 300 in accordance with an illustrative embodiment. In the illustrated embodiment, the incident resolution module 300 is an example of the incident resolution module 200 of FIGS. 1 and 2.

In the illustrated embodiment, the incident resolution module 300 comprises a training dataset generation module 302, a model training module 304, and a model deployment module 306. In alternative embodiments, the incident resolution module 300 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the training dataset generation module 302 collects data from multiple data sources 314 and analyzes the collected data to identify data related to incidents or incident resolutions. Exemplary embodiments correlate data related to incidents with data related to corresponding resolutions and create a training dataset 310 from the correlated data.

In the illustrated embodiment, the model training module 304 uses the training dataset 310 to train a machine learning model to recommend a resolution for inputted incident data. In some embodiments, the model training module 304 trains a new machine learning model. In alternative embodiments, the model training module 304 trains a pre-trained machine learning model from a pre-trained network repository 312.

In the illustrated embodiment, a backend administration system 206 allows a user with administrative privileges to monitor the training dataset generation module 302 and training dataset 310. In some embodiments, the backend administration system 206 allows an administrative user to initiate the training process, including setting desired hyper-parameters for the training process, upon observing that the training dataset 310 has reached a desired size.

In the illustrated embodiment, the model deployment module 306 receives the trained model 308 that has been trained by the model training module 304. In some embodiments, the model deployment module 306 serves as an incident resolution system that receives incident data from user device 208 and, in response, transmits a resolution recommendation to the user device 208.

In some such embodiments, the training dataset generation module 302 solicits feedback from the user device 208 regarding the resolution recommendation. In some such embodiments, the training dataset generation module 302 receives feedback from the user device 208 that includes an indication of whether the recommended resolution was accurate or effective. In some embodiments, the feedback may also include an indication of a more effective alternative resolution. In some such embodiments, the training dataset generation module 302 updates the training dataset 310 according to the feedback. In some embodiments, the model training module 304 then uses the updated training dataset 310 to retrain the trained model 308.

With reference to FIG. 4, this figure depicts a block diagram of an exemplary training dataset generation module 400 in accordance with an illustrative embodiment. In the illustrated embodiment, the training dataset generation module 400 is an example of the training dataset generation module 302 of FIG. 3.

In the illustrated embodiment, the training dataset generation module 400 is monitored by an administrative user via the backend administration system 206. The training dataset generation module 400 includes a data collection module 402, an incident detection module 404, a resolution detection module 406, a correlation module 408, and a feedback module 410. In alternative embodiments, the training dataset generation module 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the training dataset generation module 400 monitors various forms of data of monitored applications and services 416 originating from various sources, such as IT environment data 428 and hosted services data 430. The monitored applications and services 416 provide various types of data, including ticket data 418, health data 420, user action data 422, incident communications data 424, and runbooks data 426.

The ticket data 418 can include data relating to an incident such as title, description, and resolution in addition to the automatically generated metadata (e.g., application name, hosting server, middleware, infrastructure, dependencies, or other common keywords). In some embodiments, the ticket data 418 is structured data that allows the incident detection module 404 to extract incident data and allows the resolution detection module 406 to extract resolution data. The correlation module 408 may then correlate incident and resolution data extracted from the same ticket.

The health data 420 can include data based on a number of systems, system components, and system sub-components that represents various important aspects of a device's or a system's health. The health data 420 can include data indicative of various health metrics including, but not limited to, hardware performance and age, and/or software performance and age. In some embodiments, the incident detection module 404 may detect data indicative of an incident where metrics fall below a predetermined threshold. In some embodiments, the resolution detection module 406 may detect data indicative of a resolution when a health metric improves as a result of a script or application being run on the affected system. The correlation module 408 may then correlate the script or application as a resolution with the incident indicated by the affected health metric.

The user action data 422 can include data collected by tracking end user actions, for example using a session cookie, as the user navigates a computerized library of previously created runbooks and automations via a user interface. For example, in some such embodiments, the incident detection module 404 can detect an incident from user action data 422 that is indicative of which incident an SRE views. The resolution detection module 406 can detect a resolution from data indicative of a list of available runbooks or automations viewed by the SRE, and what keywords the SRE uses to search for a resolution that are also included in the incident description. The correlation module 408 can correlate the incident viewed by the user with the resolution that the SRE ultimately navigated to after viewing the incident information.

The incident communications data 424 includes data resulting from data mining and analysis of communications, such as instant messaging or chat data. For example, in some embodiments, the incident detection module 404 can identify an incident based on analyses of a chat sequence for an identifier of an incident ticket. Similarly, the resolution detection module 406 can identify a resolution based on analyses of a chat sequence for an identifier of runbook, script, application, replacement part, or other information indicative of a resolution. The correlation module 408 can correlate an incident with a resolution by identifying an indication of an incident in a chat sequence, and then an indication of a resolution in subsequent portions of the same chat sequence.

The runbooks data 426 includes data indicative of temporal and keyword-based analysis of incidents and runbooks. For example, in some embodiments, when an incident is created, within a defined time window, the process searches for matches between the incident and available runbooks by searching for runbooks having the same or similar keywords and entities, such as microservices and hosts (via IP addresses), or other identifiers. Thus, in some embodiments, the incident detection module 404 can identify an incident based on analyses of keywords known to be indicative of an incident, and the resolution detection module 406 can identify a resolution based on analyses of keywords known to be indicative of a resolution. In some embodiments, the correlation module 408 can correlate an incident with a resolution where incident and resolution keywords are identified within a single runbook.

In the illustrated embodiment, the correlation module 408 creates the training dataset 414 from the correlated data. The correlation module 408 then stores the training dataset 414 in memory 412 where the memory 412 is a computer readable storage medium.

In the illustrated embodiment, the feedback module 410 solicits feedback from the user device 208 regarding the training dataset 414 and/or a resolution recommendation generated by a machine learning model that is trained using the training dataset 414. In some such embodiments, the feedback module 410 receives feedback from the user device 208 that includes an indication of whether the training dataset 414 or recommended resolution was accurate or effective. In some embodiments, the feedback may also include an indication of an improvement to the training dataset 414 or of a more effective alternative resolution. In some such embodiments, the training dataset generation module 400 updates the training dataset 414 according to the feedback.

With reference to FIG. 5, this figure depicts a block diagram of an exemplary model training module 500 in accordance with an illustrative embodiment. In the illustrated embodiment, the model training module 500 is an example of the model training module 304 of FIG. 3.

In the illustrated embodiment, model training module 500 includes a model trainer 502 and a model evaluator 514. The model trainer 502 includes a data preparation module 504, algorithm module 506, training module 508, and machine learning model 510. In the illustrated embodiment, the model evaluator 514 includes a data preparation module 516, trained machine learning model 518, and comparator 520. In alternative embodiments, the model training module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the model trainer 502 generates a machine learning model 510 based on an algorithm provided by algorithm module 506. In an embodiment, the algorithm module 506 selects the algorithm based on one or more known machine learning algorithms. In an embodiment, model trainer 502 includes a training module 508 that trains the machine learning model 510 using the training dataset 310 generated by the training dataset generation module 302 of FIG. 3.

In some embodiments, the training dataset 310 is pre-processed by a data preparation module 504 for the model trainer 502 and/or by the data preparation 516 for the model evaluator 514. In some such embodiments, the data preparation module 504 structures the data to make best use of the machine learning model 510 and the data preparation 516 structures the data to make best use of the trained machine learning model 518. Embodiments of the data preparation modules 504 and 516 use one or more of the following heuristics:

- Linear data transformation: transform the data to make the relationship linear (e.g., log transform for an exponential relationship);
- Noise reduction: use data cleaning operations that better expose and clarify the signal in the data, e.g., remove outliers in the output variable (y) where possible;
- Collinearity reduction: calculate pairwise correlations for the input data and remove the most correlated to prevent over-fitting of the data due to highly correlated input variables;
- Gaussian distribution: transform the input data (e.g., logarithmic or Box-Cox transformation) so that input and output variables have a Gaussian distribution; and
- Rescale Inputs: scale data using normalization (e.g., rescale data so that values are within a range of 0 and 1) or standardization (e.g., rescale data so that the mean of observed values is 0 and the standard deviation is 1).

In an embodiment, the training module 508 trains the machine learning model 510 using the training dataset 310, resulting in the trained machine learning model 518. In an embodiment, the model evaluator 514 receives the trained machine learning model 518, which is a trained (or re-trained), and thereby updated, version of the machine learning model 510. In some embodiments, the model evaluator 514 evaluates the accuracy of the machine learning model 518 using the comparator 520 to compare the output of the machine learning model 518 to a label associated with the input to the machine learning model 518 where the label indicates a correct output. In some embodiments, the training dataset 310 is divided into two discrete subsets, where one subset is used by the model trainer 502 and the other subset is used by the model evaluator 514. In some embodiments, the comparator 520 outputs an indication of the accuracy of the trained machine learning model 518 to the backend administration system 206 for review by an administrative user. In some embodiments, the administrative user may determine if the accuracy of the trained machine learning model 518 is acceptable or if the machine learning model 518 requires further training to achieve a desired degree of accuracy. If the accuracy is acceptable, the backend administration system 206 can instruct the model training module 500 to output the final trained model 512.

Figure 6:
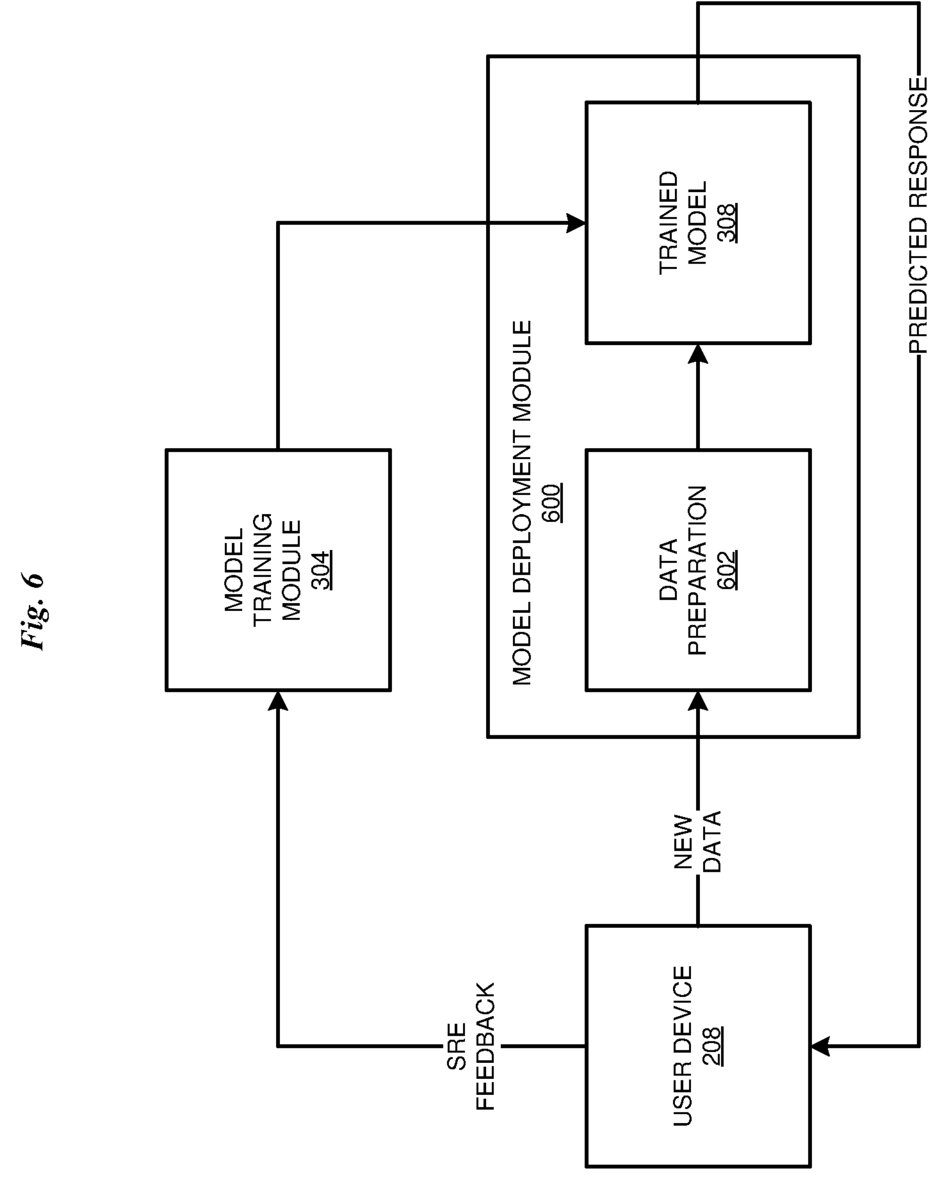
FIG. 6 depicts a block diagram of an exemplary model deployment module in accordance with an illustrative embodiment.

With reference to FIG. 6, this figure depicts a block diagram of an exemplary model deployment module 600 in accordance with an illustrative embodiment. In the illustrated embodiment, the model deployment module 600 is an example of the model deployment module 306 of FIG. 3.

In the illustrated embodiment, the model deployment module 600 includes a data preparation module 602 and the trained model 308 of FIG. 3 generated by the model training module 304 of FIG. 3. In some embodiments, the trained model 512 of FIG. 5 is used as the trained model trained model 308.

In some embodiments, the model deployment module 600 receives the trained model 308 from the model training module 304. In some embodiments, model deployment module 600 receives new incident data from the user device 208 as part of a resolution request. In some embodiments, the data preparation 602 structures the received new incident data to make best use of the trained machine learning model 308 using one or more of the heuristics described in connection with the data preparation 504 and data preparation 516 of FIG. 5. The model deployment module 600 then uses the trained model 308 to infer and make a resolution recommendation for the input new incident data and provides the recommendation to the user device 208.

In the illustrated embodiment, the model training module 304 solicits feedback from the user device 208 regarding the resolution recommendation generated by the model deployment module 600. In some such embodiments, the model training module 304 receives feedback from the user device 208 that includes an indication of whether the recommended resolution was accurate or effective. In some embodiments, the feedback may also include an indication of a more effective alternative resolution. In some such embodiments, the model training module 304 updates the training dataset and retrains the trained model 308 according to the feedback.

Figure 7:
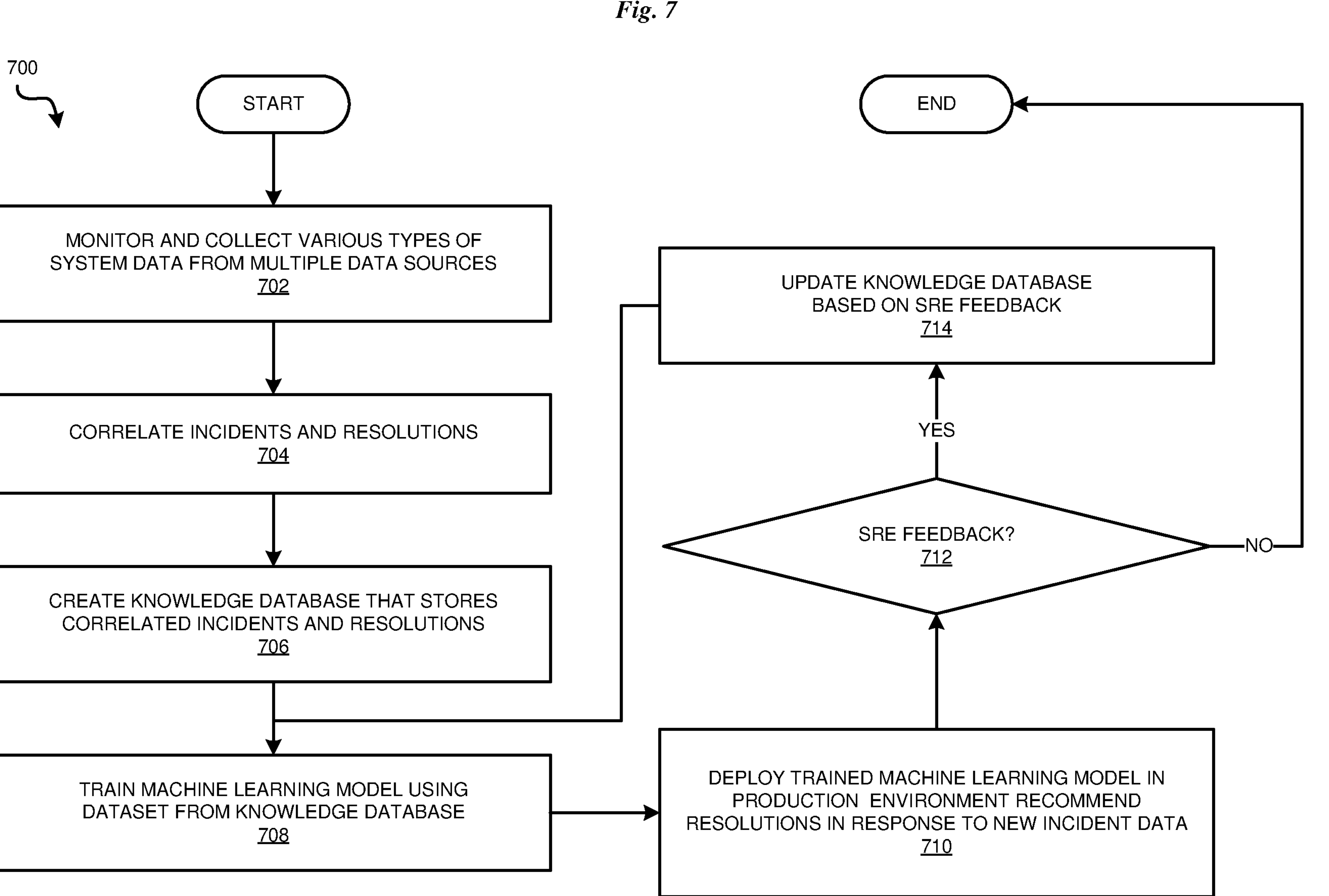
FIG. 7 depicts a flowchart of an example process for automated generation of training data for an artificial intelligence based incident resolution system in accordance with an illustrative embodiment.

With reference to FIG. 7, this figure depicts a flowchart of an example process 700 for automated generation of training data for an artificial-intelligence based incident resolution system in accordance with an illustrative embodiment. In a particular embodiment, the incident resolution module 200 of FIGS. 1 and 2 or incident resolution module 300 of FIG. 3 carries out the process 700.

In the illustrated embodiment, at block 702, the process monitors and collects various types of system data from multiple data sources. Next, at block 704, the process correlates incidents and resolutions detected in the collected system data. Next, at block 706, the process creates a knowledge database for use as training data that stores correlated incidents and resolutions. Next, at block 708, the process trains a machine learning model using the training dataset. Next, at block 710, the process deploys the trained machine learning model in a production environment to recommend resolutions in response to new incident data. Next, at block 712, the process determines whether an SRE or other user is providing feedback regarding the recommended resolution. If feedback is received, the process proceeds to block 714. At block 714, the process updates the knowledge database, and thereby updates the training dataset, based on the received feedback. The process then returns to block 708, where the machine learning model is retrained using the updated training data, and then re-deployed at block 710. If no feedback is received at block 712, the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client’s operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

monitoring, by an application performance monitoring tool, an information technology (IT) environment, the monitoring causing collecting monitored data from the IT environment;

extracting health metrics data from the monitored data collected by the application performance monitoring tool;

detecting incident data indicative of an incident where a health metric of the health metrics data metrics falls below a predetermined threshold;

detecting resolution data indicative of a resolution where the health metric of the health metrics data improves as a result of executing a script in the IT environment;

extracting the incident data and the resolution data from the monitored data collected by the application performance monitoring tool while monitoring the IT environment;

correlating the incident data with the resolution data according to a detected change in health metrics data resulting in a correlated dataset;

generating a training dataset based on the correlated dataset;

storing the training dataset in a computer-readable database;

training a machine learning model using the training dataset resulting in a trained machine learning model; and deploying the trained machine learning model within the IT environment such that the trained machine learning model provides resolution recommendation in response to receiving new incident data from an application within the IT environment.

2. The computer-implemented method of claim 1, wherein the monitored data includes data collected from a micro-service in the IT environment.

3. The computer-implemented method of claim 1, wherein the correlating of incident data and resolution data includes correlating incident data with a runbook action.

4. The computer-implemented method of claim 1, wherein the monitored data includes data indicative of end user actions and end user communications.

5. The computer-implemented method of claim 4, wherein the correlating of the incident data with the resolution data includes performing keyword-based analysis on runbooks.

6. The computer-implemented method of claim 4, wherein the correlating of the incident data with the resolution data includes performing data mining of end user communications.

7. The computer-implemented method of claim 1, wherein the training of the machine learning model includes training the machine learning model to understand incident and resolution relationships.

8. The computer-implemented method of claim 1, wherein the training of the machine learning model includes training the machine learning model to recommend a runbook in response to an inputted incident.

9. The computer-implemented method of claim 1, further comprising collecting user feedback and updating the dataset based on the user feedback.

10. A computer program product comprising one or more computer readable storage media, and program instructions collectively stored on the one or more computer readable storage media, the program instructions executable by a processor to cause the processor to perform operations comprising:

monitoring, by an application performance monitoring tool, an information technology (IT) environment, the monitoring causing collecting monitored data from the IT environment;

extracting health metrics data from the monitored data collected by the application performance monitoring tool;

detecting incident data indicative of an incident where a health metric of the health metrics data metrics falls below a predetermined threshold;

detecting resolution data indicative of a resolution where the health metric of the health metrics data improves as a result of executing a script in the IT environment;

extracting the incident data and the resolution data from the monitored data collected by the application performance monitoring tool while monitoring the IT environment;

correlating the incident data with the resolution data according to a detected change in health metrics data resulting in a correlated dataset;

generating a training dataset based on the correlated dataset;

storing the training dataset in a computer-readable database;

training a machine learning model using the training dataset resulting in a trained machine learning model; and deploying the trained machine learning model within the IT environment such that the trained machine learning model provides resolution recommendation in response to receiving new incident data from an application within the IT environment.

11. The computer program product of claim 10, wherein the stored program instructions are stored in a computer readable storage device in a data processing system, and wherein the stored program instructions are transferred over a network from a remote data processing system.

12. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

13. The computer program product of claim 10, wherein the monitored data includes data collected from a micro-service in the IT environment.

14. The computer program product of claim 10, wherein the correlating of incident data and resolution data includes correlating incident data with a runbook action.

15. A computer system comprising a processor and one or more computer readable storage media, and program instructions collectively stored on the one or more computer readable storage media, the program instructions executable by the processor to cause the processor to perform operations comprising:

monitoring, by an application performance monitoring tool, an information technology (IT) environment, the monitoring causing collecting monitored data from the IT environment;

extracting health metrics data from the monitored data collected by the application performance monitoring tool;

detecting incident data indicative of an incident where a health metric of the health metrics data metrics falls below a predetermined threshold;

detecting resolution data indicative of a resolution where the health metric of the health metrics data improves as a result of executing a script in the IT environment;

extracting the incident data and the resolution data from the monitored data collected by the application performance monitoring tool while monitoring the IT environment;

correlating the incident data with the resolution data according to a detected change in health metrics data resulting in a correlated dataset;

generating a training dataset based on the correlated dataset;

storing the training dataset in a computer-readable database;

training a machine learning model using the training dataset resulting in a trained machine learning model; and deploying the trained machine learning model within the IT environment such that the trained machine learning model provides resolution recommendation in response to receiving new incident data from an application within the IT environment.

16. The computer system of claim 15, wherein the monitored data includes data collected from a micro-service in the IT environment.

17. The computer system of claim 15, wherein the correlating of incident data and resolution data includes correlating incident data with a runbook action.

* * * * *